United States Patent
Stuessel et al.

(10) Patent No.: US 11,622,534 B2
(45) Date of Patent: Apr. 11, 2023

(54) MODULAR ROTARY SWIVEL FOR ROTARY MILKING PARLOR

(71) Applicant: GEA Farm Technologies, Inc., Naperville, IL (US)

(72) Inventors: Matthew J Stuessel, Alma Center, WI (US); Eric M Stussy, Onalaska, WI (US)

(73) Assignee: GEA Farm Technologies, Inc., Romeoville, IL (US)

(*) Notice: Subject to any disclaimer, the term of this patent is extended or adjusted under 35 U.S.C. 154(b) by 155 days.

(21) Appl. No.: 17/095,208

(22) Filed: Nov. 11, 2020

(65) Prior Publication Data

US 2021/0169039 A1 Jun. 10, 2021

Related U.S. Application Data

(60) Provisional application No. 62/944,424, filed on Dec. 6, 2019.

(51) Int. Cl.
*A01K 1/12* (2006.01)

(52) U.S. Cl.
CPC .................... *A01K 1/126* (2013.01)

(58) Field of Classification Search
CPC . A01K 1/126; A01K 1/12; F16L 39/06; A01J 5/003; A01J 5/044
USPC ...................................... 119/14.04
See application file for complete search history.

(56) References Cited

U.S. PATENT DOCUMENTS

| | | | | |
|---|---|---|---|---|
| 2,293,585 A | * | 8/1942 | Bard | F16L 39/06 285/121.5 |
| 3,851,663 A | * | 10/1974 | Neuko | F16L 27/08 137/580 |
| 4,126,336 A | | 11/1978 | Ortloff et al. | |
| 4,288,106 A | | 9/1981 | Foolen | |
| 4,555,118 A | | 11/1985 | Saliger | |
| 4,662,657 A | * | 5/1987 | Harvey | F16L 39/06 285/121.6 |
| 4,683,912 A | * | 8/1987 | Dubrosky | B25J 19/0041 901/29 |
| 4,781,404 A | | 11/1988 | Tharp et al. | |
| 4,940,182 A | | 7/1990 | Heyne | |
| 5,797,413 A | * | 8/1998 | Pollack | F16L 39/06 285/190 |

(Continued)

FOREIGN PATENT DOCUMENTS

| | | |
|---|---|---|
| EP | 1939133 A1 | 4/2012 |
| KR | 20170116495 A | 10/2017 |

(Continued)

OTHER PUBLICATIONS

International Search Report and Written Opinion from PCT/US2020/059948, dated Feb. 8, 2021, 14 pages.

*Primary Examiner* — Timothy D Collins
*Assistant Examiner* — Maria E Graber
(74) *Attorney, Agent, or Firm* — BainwoodHuang

(57) ABSTRACT

A rotary milking parlor swivel comprising a stationary central core defining a milk line and a media inlet port; a rotating sleeve disposed at least partially around the stationary central core, and the rotating sleeve includes a first segment defining a milk inlet port in communication with the milk line and a second segment defining a media outlet port in communication with the media inlet port.

16 Claims, 13 Drawing Sheets

(56) References Cited

U.S. PATENT DOCUMENTS

| | | | | |
|---|---|---|---|---|
| 6,105,536 | A | * | 8/2000 | DeWaard ................ A01J 7/04 |
| | | | | 119/14.18 |
| 6,412,823 | B1 | * | 7/2002 | Odegaard ........... E21B 33/085 |
| | | | | 285/900 |
| 6,578,603 | B1 | * | 6/2003 | Odegaard ............. F16L 39/06 |
| | | | | 285/190 |
| 6,742,308 | B1 | * | 6/2004 | Johnstone, III ......... F16L 39/06 |
| | | | | 52/220.8 |
| 8,479,766 | B2 | * | 7/2013 | Hugel ................ B41F 13/085 |
| | | | | 137/580 |
| 2005/0253385 | A1 | * | 11/2005 | Larsen .................. F16L 39/06 |
| | | | | 285/223 |
| 2006/0201071 | A1 | * | 9/2006 | Johnstone, III ....... E04B 1/3465 |
| | | | | 52/65 |
| 2006/0230690 | A1 | * | 10/2006 | Dunick ................ E04B 1/3465 |
| | | | | 52/64 |

FOREIGN PATENT DOCUMENTS

| | | | | |
|---|---|---|---|---|
| WO | WO-2005071305 A1 | * | 8/2005 | ........... E04B 1/3465 |
| WO | WO-2019053701 A | * | 3/2019 | ............. A01K 1/126 |

* cited by examiner

MODULAR ROTARY SWIVEL FOR ROTARY MILKING PARLOR

CROSS REFERENCE TO RELATED APPLICATION

This application claims the benefit of U.S. Provisional Application 62/944,424, filed Dec. 6, 2019, the disclosure of which is incorporated by reference herein.

FIELD AND BACKGROUND OF THE INVENTION

The invention relates to a swivel assembly for a rotary milking parlor, and more particularly to a modular swivel assembly including stackable sleeve and core segments to connect rotating stalls with stationary media sources.

Rotary milking parlors include a rotating platform on which cows are positioned in milking stalls for milking while the platform rotates. Rotary milking parlors rotate about a central axis, and include a central swivel valve arrangement through which milk can flow from the rotating platform to a stationary milk line. At the same time, vacuum, water, electricity, and optional media such as air, water, teat dips, and milker unit backflushing fluids can be distributed from stationary storage sources onto the rotating platform to the individual milking stalls. All of these fluids and electricity can flow through a central swivel assembly with inlet ports and outlet ports.

All rotary platforms require a milk line, electrical service, and milking vacuum, while water and bad milk lines are optional. Sanitizing media may be optional and not all rotary platforms require the same types of media. For example, air can be used to operate milker units and sanitation valves, but water, teat dip, and backflushing media fluids may not be used unless there are automated teat dip applicators and milker unit backflushers on board.

Many rotary milking parlors use a standard swivel assembly design for milk, electric supply, vacuum, and water. Media swivels are also standard sizes and are configured for a fixed number of media, regardless of whether all media types are used. Most swivels have a central stationary core and a rotating sleeve around the core. Media fluids flow through conduits in the stationary core and then out through the rotating sleeve. Milk flows through separate conduits in the opposite directions. The media swivels are complex because they provide conduits for a variety of media, and require closely mating conduit openings, including seals to reduce leakage between the core and the sleeve conduits. To minimize cost, media swivels are manufactured with a milk line pass through conduit and a set number of media ports of equal size regardless of whether the media is needed or the port sizes are appropriate for the various media in a particular dairy.

Further, the volume of each individual media passing through media swivels can vary depending upon the type of media and the size of the rotary parlor. Air conduits may be a different size than backflushing fluid conduits, for example. Oversizing or undersizing media ports and conduits can complicate distribution.

Swivels, especially media swivels, also need seals to prevent leaking of fluids out of the swivel and between stationary and moving components. Seals in media swivels are disposed in pairs between the rotating sleeve and stationary core ports, and a vent or "bleed" is disposed between each pair of seals to create a block-bleed-block arrangement and prevent media leaking into adjacent ports. Constant rotation of the sleeve relative to the core, and exposure to teat dips and backflushing fluids imposes a rigorous maintenance requirement to replace the seals. High quality elastomers, such as FKM Extreme Seals are used to resist degradation from exposure to the media, particularly teat dips. Media swivel seals are expensive, especially considering the labor required to replace worn seals. Using a uniform swivel size and configuration can cause unnecessary use of seals, and add to the cost of maintaining rotary parlor swivels.

In addition, the seals used to isolate the various media ports from one another are positioned between the central stationary inlet core of the swivel and the outer rotating sleeve. Lubrication is necessary to reduce friction between the seals and the adjacent ports. A seal that remains at the same elevation and simply slides on the stationary core cannot be lubricated properly because there is no way to introduce lubrication under the seals. To enable lubricants to be spread on stationary core parts under the seals, the sleeve in some swivel designs includes a lower edge that rides on stationary lower lugs as the sleeve rotates. Similarly, an upper edge is supported by upper lugs. Cams on the lower edge and the upper edge raise and lower the entire sleeve as the cams rotate over the lugs. The resulting vertical oscillating motion allows lubrication to be distributed under the seals, but of course, such a design adds design, manufacturing, and maintenance costs.

Thus, there is needed a rotary milking parlor media swivel that accommodates the specific needs of particular parlors, but reduces fabrication and maintenance costs and increases media distribution efficiency.

SUMMARY OF THE INVENTION

The present invention includes a rotary milking parlor media swivel with a stationary central core and a rotating sleeve that are assembled from modular units to be added as needed for individual rotary parlor designs. At least one media inlet port is arranged in the stationary core. Around the core is a rotating sleeve having at least one media outlet port. The sleeve defines an annular conduit to mate with a conduit defined in the stationary core segment. Fluids pass between the stationary core and the rotating sleeve through the ports and annular conduits inside the sleeve. Rather than having a uniform media swivel arrangement, the invention uses individual modular sleeve segments and core segments for each type of media that will be used on the associated rotary milking platform.

For a platform requiring only air, for example, there will be a basic milk line arrangement and only one media sleeve segment and media core segment with appropriately sized ports to form a module. If other media types are desired or a greater volume of media is required, additional modules having appropriate conduit and port sizes, can be stacked to accommodate the number, type, and volume of desired media. Individual segments can be used for different types of media to serve the stalls on the rotary platform. Redundant media segments may be necessary on larger rotary platforms to provide an ample supply of media. For example, two backflushing fluid segments may be used, and using a modular core and sleeve makes this easy to implement.

The core segments can be joined together in any suitable manner, such as with bolts, releasable connectors, mating keys and recesses, or any other suitable connector types that are releasable to allow access for maintenance and repairs.

Seals between the core segments are preferably used, and the segments can be disassembled for repair, replacement, and maintenance.

Sleeve segments are preferably joined at bearings to transfer bearing and torsional loads between rotating sleeve segments, as well as to provide a vent location between pairs of seals to reduce seepage between seals with a block-bleed-block arrangement. The sleeve segments mate with corresponding core segments and are also preferably sealed at their interfaces with block-bleed-block seal arrangements.

In addition to the stacking core and sleeve segments described above, seals used in the present invention are preferably spring energized seals using a polyethylene annular cup with a Hastelloy coiled spring disposed in the cup. The polyethylene cup engages the mating surfaces to be sealed, and the spring maintains interface engagement even if the cup surface wears. The polyethylene resists degradation from teat dips and backflushing fluids, and does not require lubrication like elastomer seals. In addition, energized spring seals cost less than FKM (fluorocarbon elastomer seals). With spring energized seals, the cam and lug arrangements (described above) are unnecessary and, thus, considerable expense in rotary parlor design and maintenance is saved.

Additional details and advantages of the present invention are provided below.

DETAILED DESCRIPTION OF THE INVENTION

Figure 1:
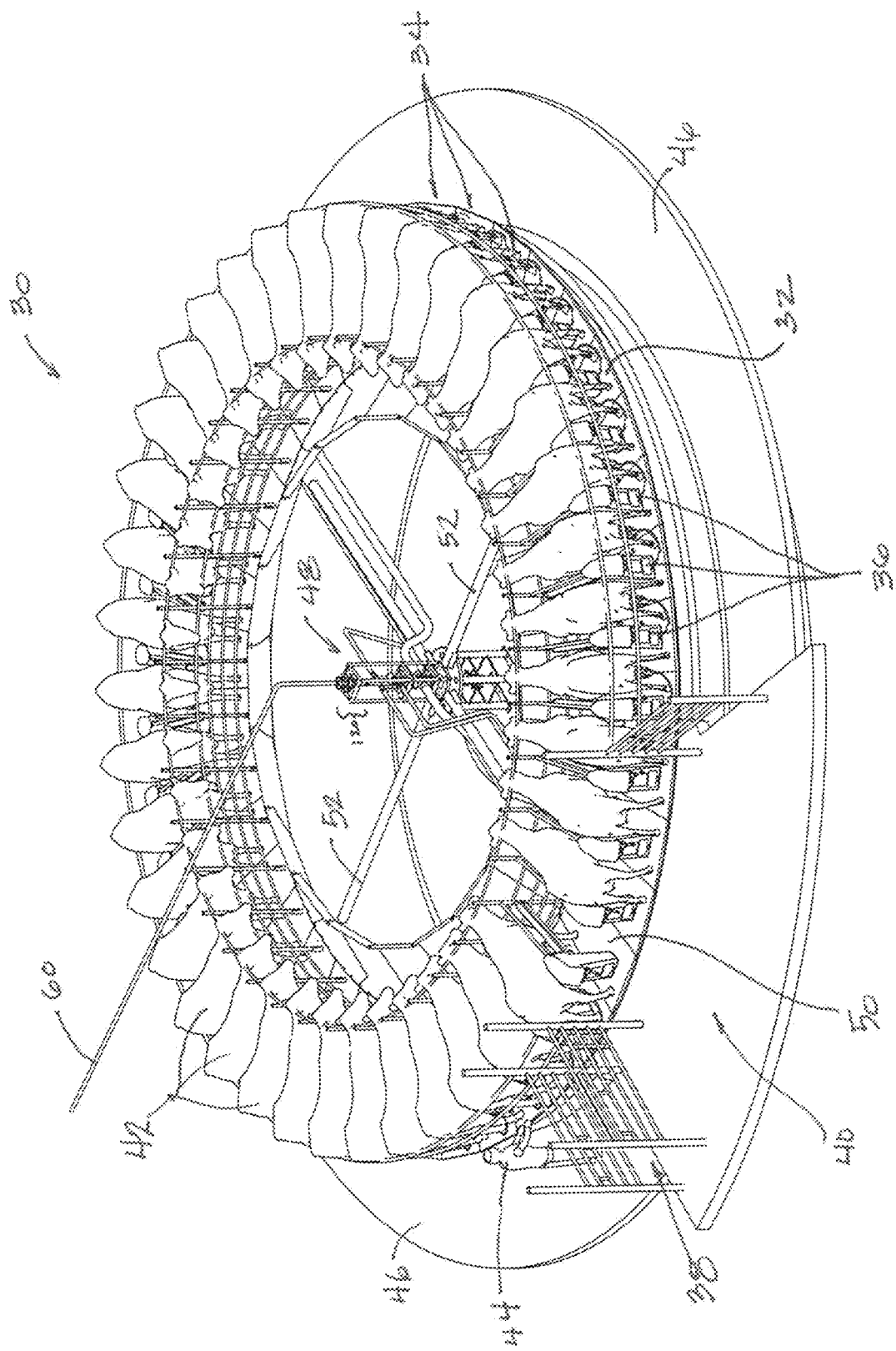
FIG. 1 is a perspective view of a rotary milking parlor.

In the following detailed description, the same reference numeral will be used for the same element in each of the figures.

Rotary Milking Parlor Overview

Illustrated in FIG. 1 is a rotary milking parlor 30 having a rotating platform 32, a number of milking stalls 34 on the rotating platform 32, and a milker unit 36 in each of the milking stalls 34. A stationary entrance 38 and an exit 40 are depicted as well. Dairy animals 42 (cows in the illustrated example) enter the rotating platform 32 via the stationary entrance 38 and stand in the milking stalls 34 while being milked by the milker units 36. After milking, the animals leave via the stationary exit 40. A dairy operator 44 stands on a lower deck 46 to prepare the dairy animals 42 for milking and to attach the milker units 36 to the animals 42.

A rotary platform drive mechanism (not illustrated, but located in a substructure 47 in FIG. 2) rotates the rotating platform 32 about a central pivot location 48. The illustrated embodiment is just an example of a rotary dairy milking parlor suitable for use with the present invention, and the present modular media swivel invention can be used with other rotary parlor configurations as well.

Figure 2:
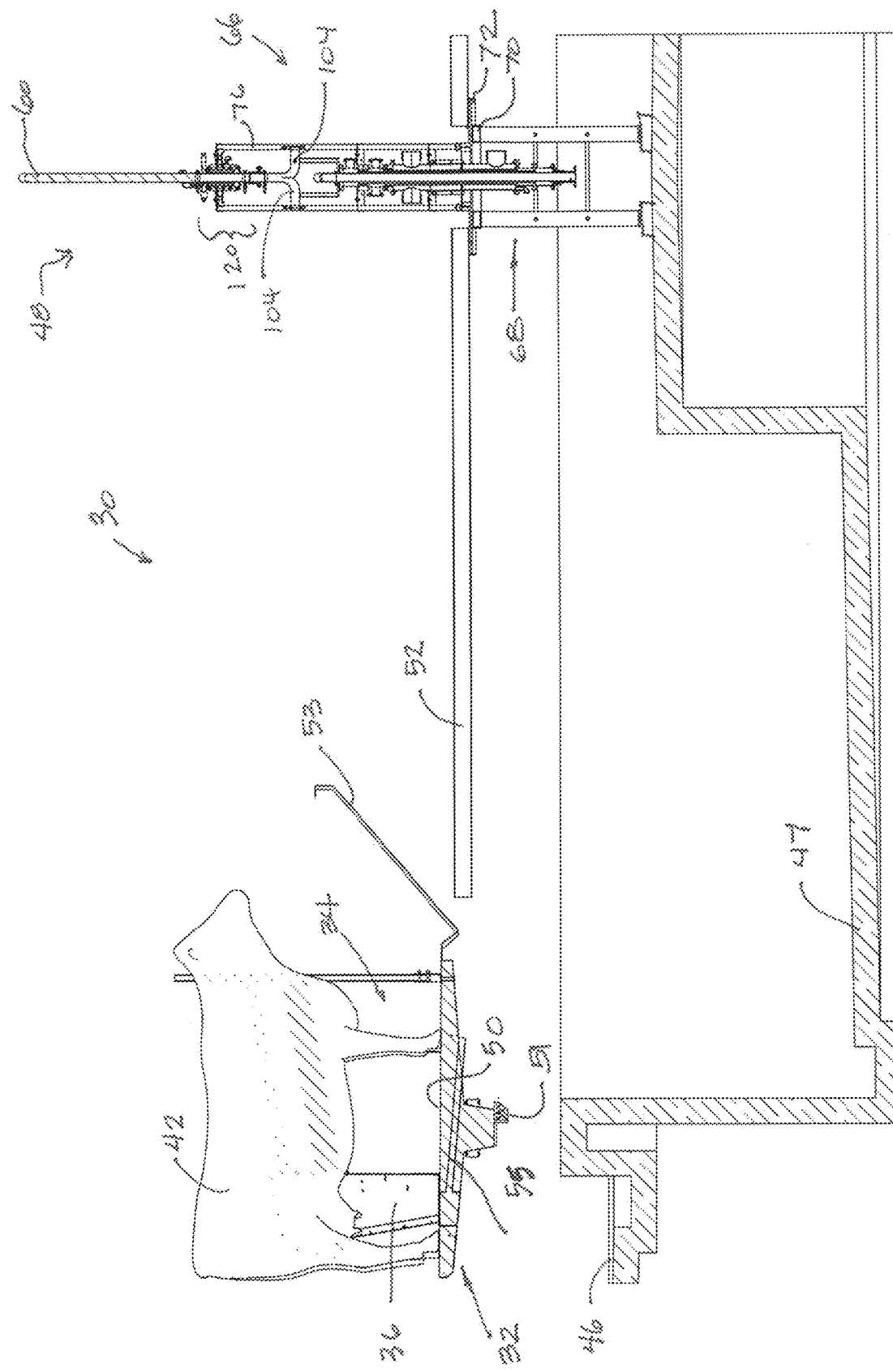
FIG. 2 is a partial cross-sectional view of the rotary milking parlor of FIG. 1.

As best seen in FIGS. 1 and 2, the rotary milking parlor 30 rotating platform 32 includes a deck portion 50 on which the dairy animals 42 stand. To reduce weight, the inner portion of the rotary platform preferably is not solid, but instead includes spokes 52 extending between the deck portion 50 and the central pivot location 48 to save weight and still maintain alignment of the deck portion 50 and the central pivot location 48. A deck support roller assembly 51 is disposed to support the deck portion 50 as it rotates. A splash shield 53 is also provided at the edge of the rotating deck portion 50.

The rotating platform 32 rotates while dairy animals 42 are being milked, so milk is transported from the milker units 36 through a deck conduit 55 to a stationary milk line 60. Generally, the milk flows from the rotating milker units 36 to the stationary milk line 60 via a rotary milking parlor swivel assembly 66, which is located in the central pivot location 48. Further details are provided below.

In addition to transporting the milk off the rotating platform 32, other fluids such as waste milk and used washing fluids must also be removed. It is also necessary to supply electricity, water, and vacuum from stationary sources to operate the milker units 36 on the rotating platform 32. Other various media fluids such as teat dips and backflushing fluids must also be transported from stationary sources onto the rotating platform 32.

To accomplish this result, FIGS. 2 through 7 illustrate the rotary milking parlor swivel assembly 66 as having a stationary frame 68 resting on the substructure 47 and having any suitable construction including the illustrated post and horizontal strut construction. The stationary frame 68 also includes a stationary top plate 70 (see FIG. 4, for example) on which a rotating base plate 72 is positioned. The rotating plate 72 is joined to the spokes 52 with brackets or by any other suitable connection, and preferably includes a trough 74 to support electric cables supplying power to the milker units 36 as well as any other type of milk, water, or media line extending between the swivel assembly 66 and the milker units 36.

A rotating frame 76 rests on and rotates with the rotating plate 72. The rotating frame 76 can be of any suitable construction including the post and strut construction illustrated. Any appropriate bearing arrangement can be used between the stationary top plate 70 and the rotating base plate 72.

Figure 3:
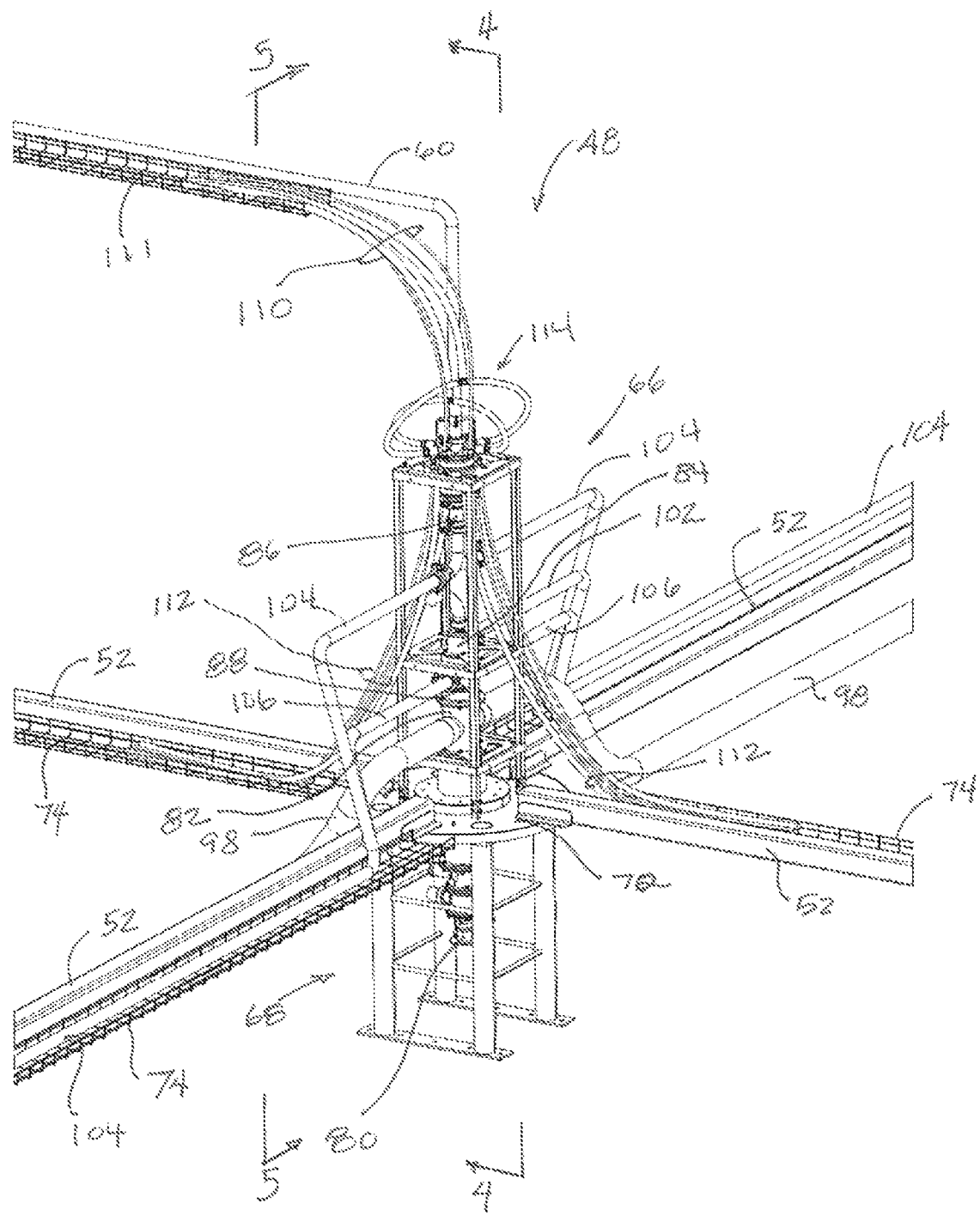
FIG. 3 is a perspective view of a rotary milking parlor swivel assembly including a modular media swivel assembly in accordance with the present invention.
Figure 4:
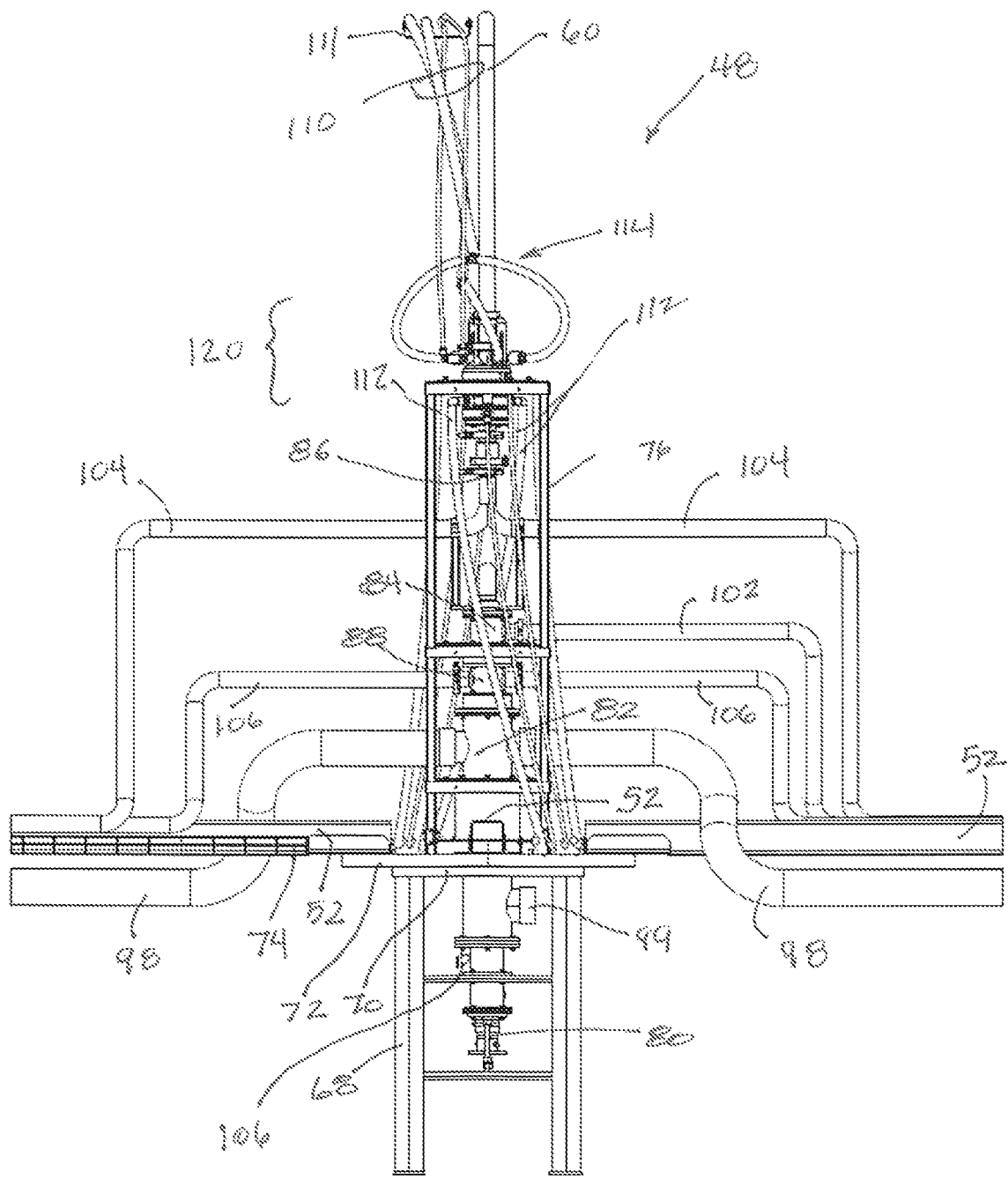
FIG. 4 is a first side elevational view of the rotary milking parlor swivel assembly with a modular media swivel assembly taken from the perspective of line 4-4 in FIG. 3 with various stationary and rotating conduits and lines.
Figure 5:
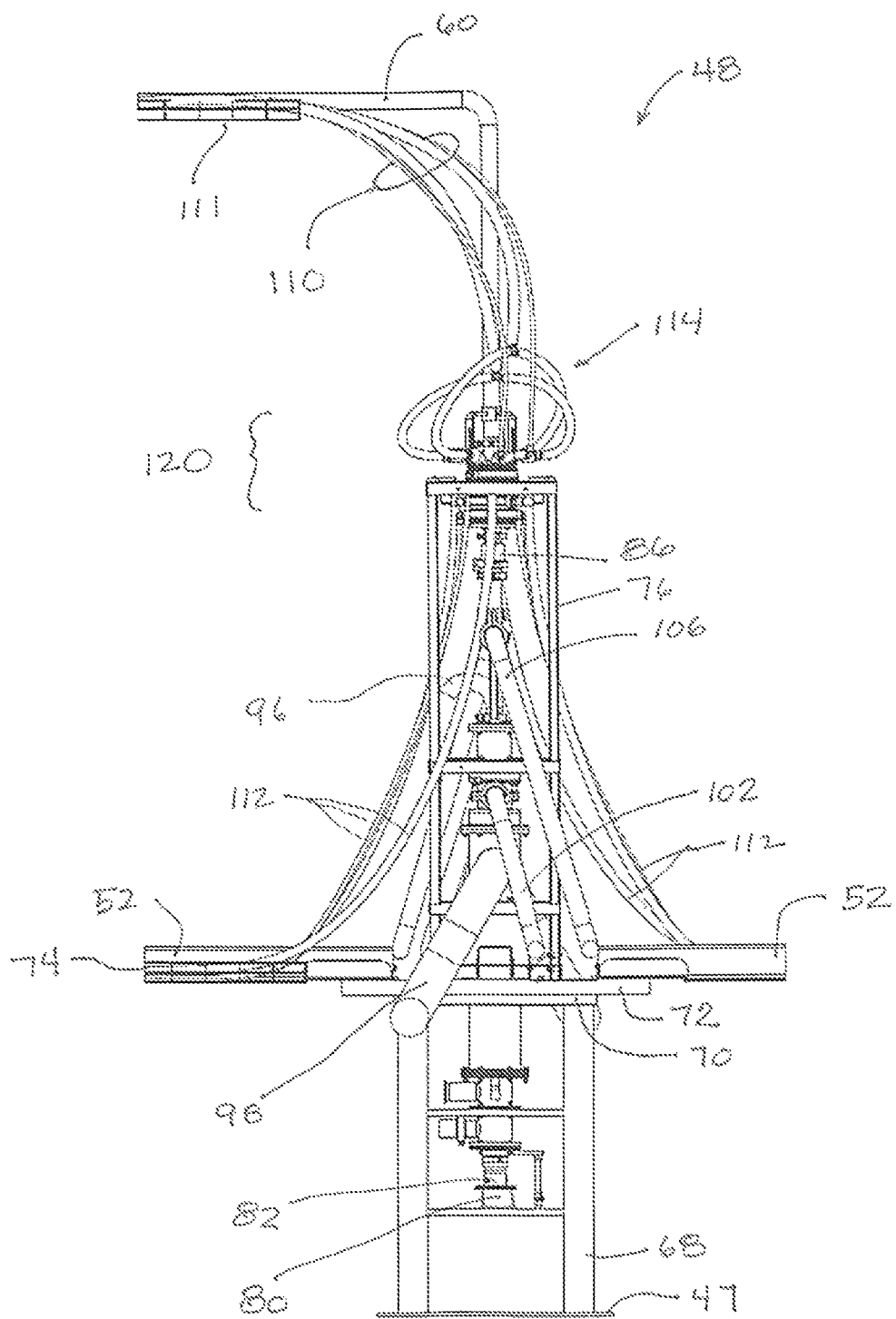
FIG. 5 is a second side elevational view of the rotary milking parlor swivel assembly with a modular media swivel assembly taken from the perspective of line 5-5 in FIG. 3.

In the illustrated embodiment, the stationary frame 68 supports an electric swivel 80, a vacuum swivel 82, a fresh water swivel 84, a good milk swivel 86, and an optional bad milk swivel 88, all of which are of standard construction. Also provided is a multiport modular media swivel 120, in accordance with the present invention. The various swivels are disposed in a preferred order as listed above from bottom to top for ease of construction and maintenance, but other swivel arrangements can be used. The rotating frame 76 engages rotating portions of the swivels and/or their respective rotating conduits. FIGS. 3, 4, and 5 depict fluid lines 96 in the trough 74 extending between the electric swivel 80 and the milker units 36. Milk, water, electric, and media lines can be supported in the trough 74.

A pair of rotating vacuum lines 98 and a stationary vacuum line 99 are joined to the vacuum swivel 82, a rotating fresh water line 102 is joined to the fresh water swivel 84, a pair of rotating good milk lines 104 and stationary good milk line 60 are joined to the good milk swivel 86, and a pair of rotating bad milk lines 106 and a stationary bad milk line are joined to the bad milk swivel 88. Air lines can also be included. For the various media being used, stationary media inlet lines 110 enter from overhead in a supporting trough 111 from a suitable media source. The stationary media inlet lines 110 can be split at a bifurcating junction 114. Rotating media outlet lines 112 are supported in the deck trough 74.

Figure 6:
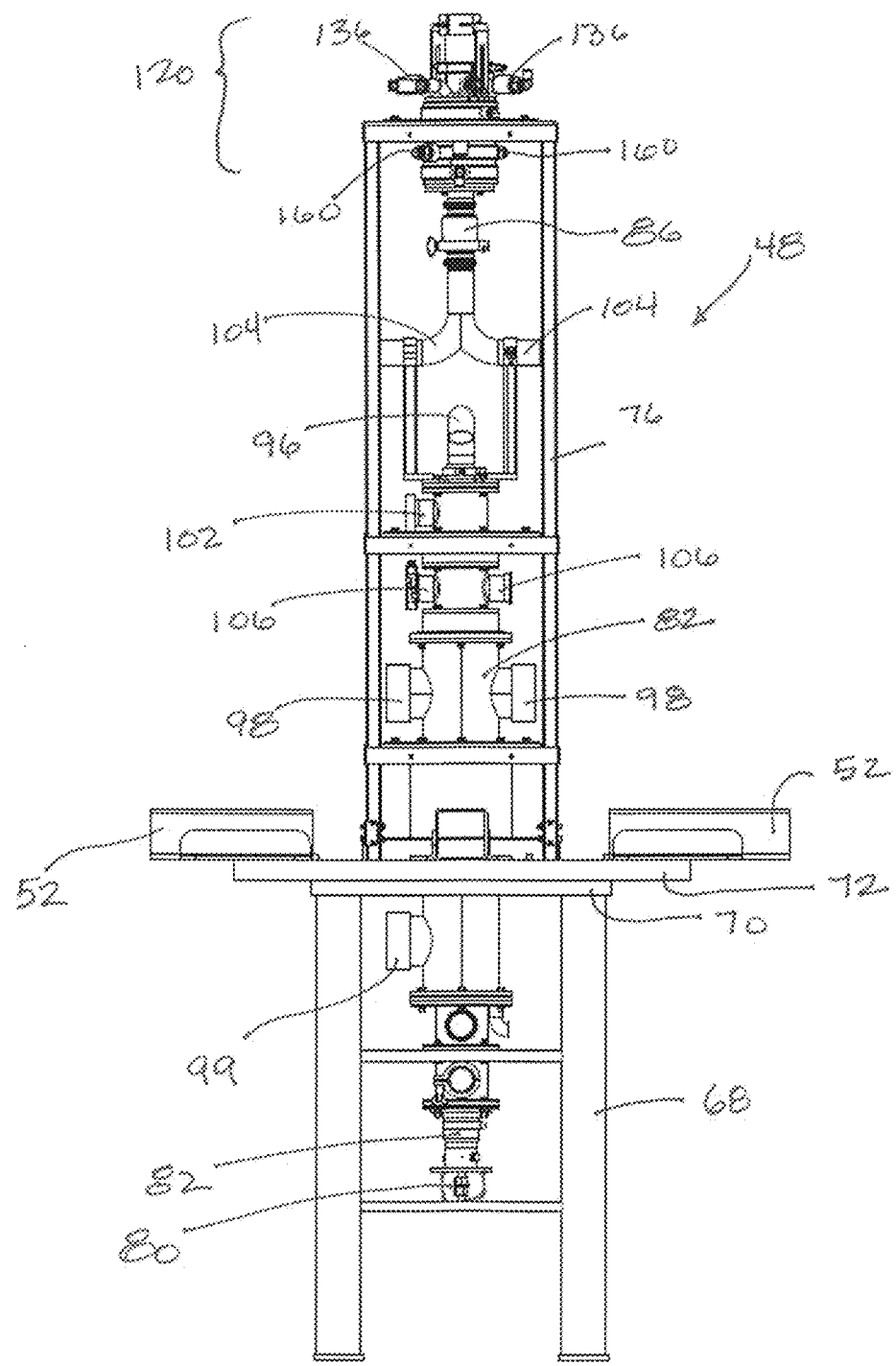
FIG. 6 is the first side elevational view of the rotary milking parlor swivel assembly with a modular media swivel assembly of FIG. 4 with the various stationary and rotating conduits removed.
Figure 7:
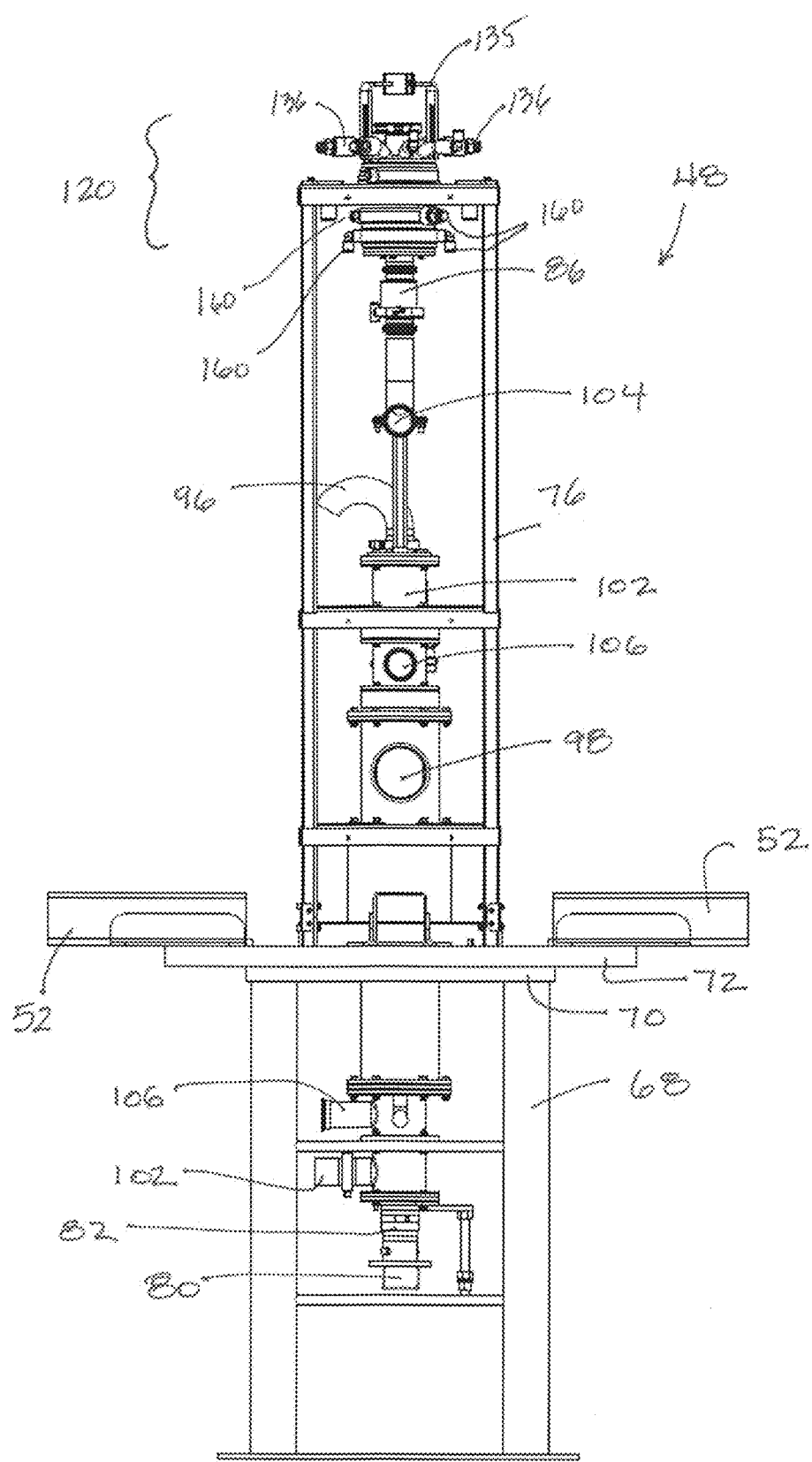
FIG. 7 is the second side elevational view of the rotary milking parlor swivel assembly with a modular media swivel assembly of FIG. 5 with the various stationary and rotating conduits removed.
Figure 8:
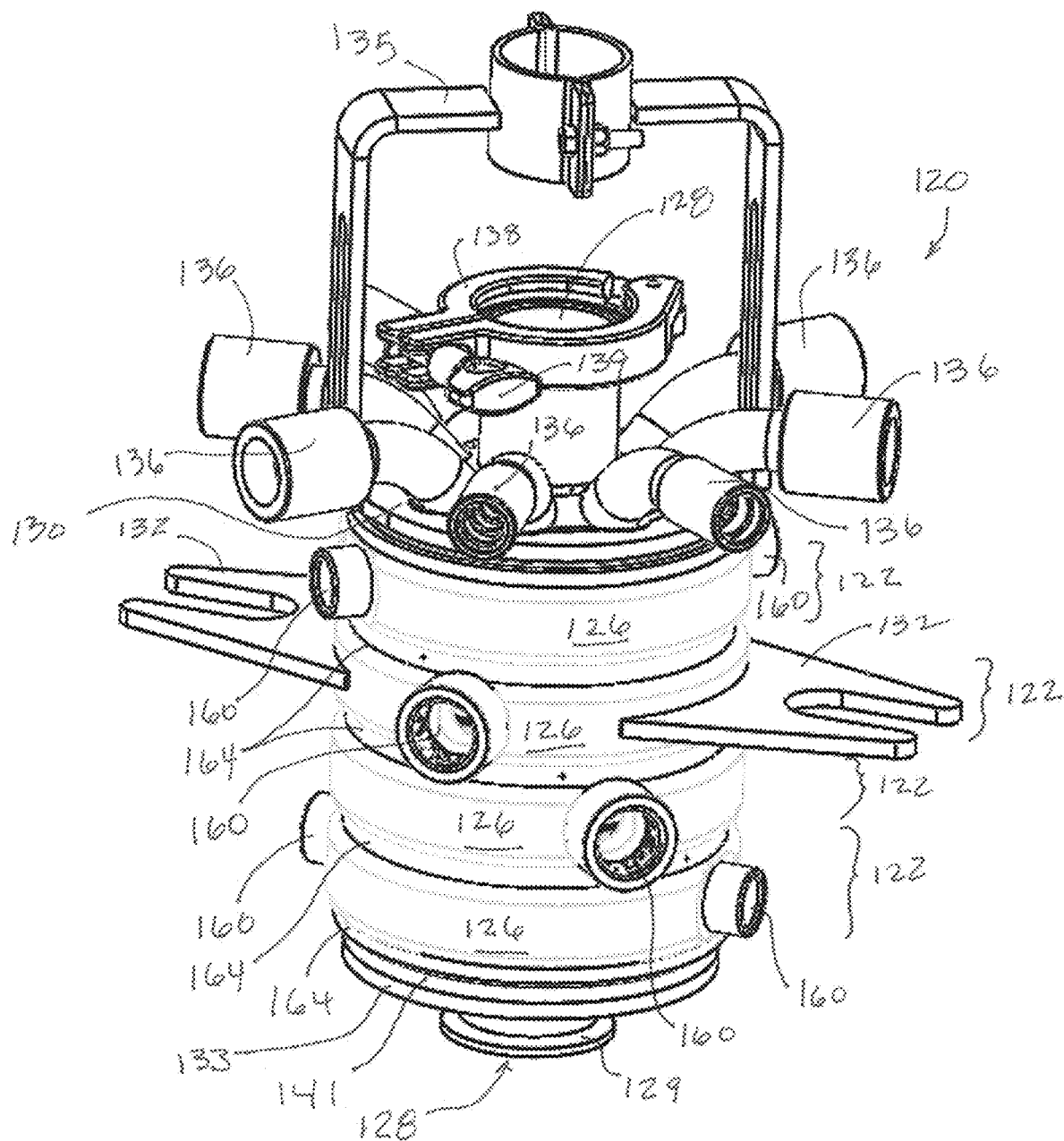
FIG. 8 is a perspective view of a modular rotary milking parlor swivel in accordance with the present invention.
Figure 9:
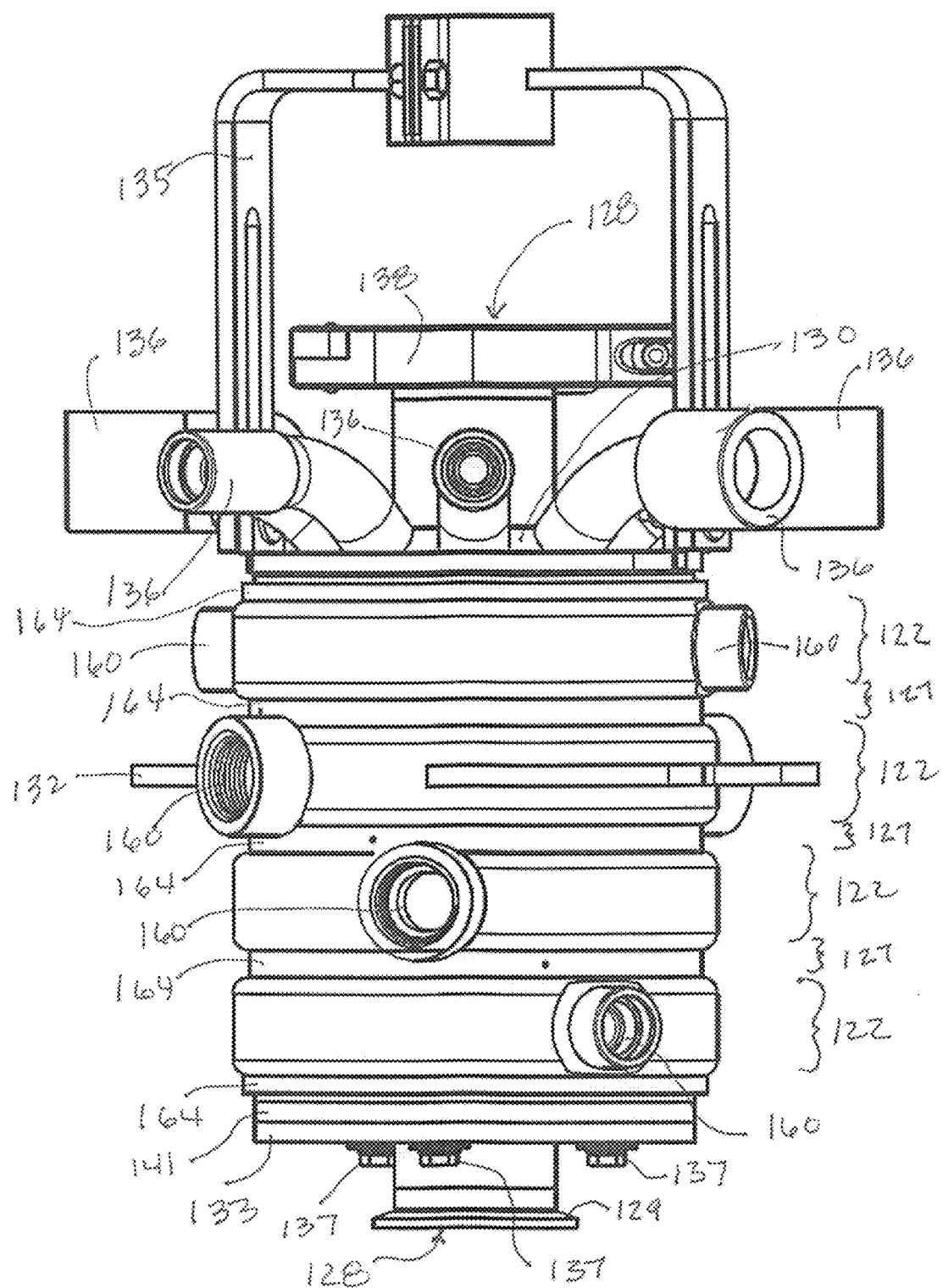
FIG. 9 is a side elevation view of the modular rotary milking parlor media swivel of FIG. 8.
Figure 10:
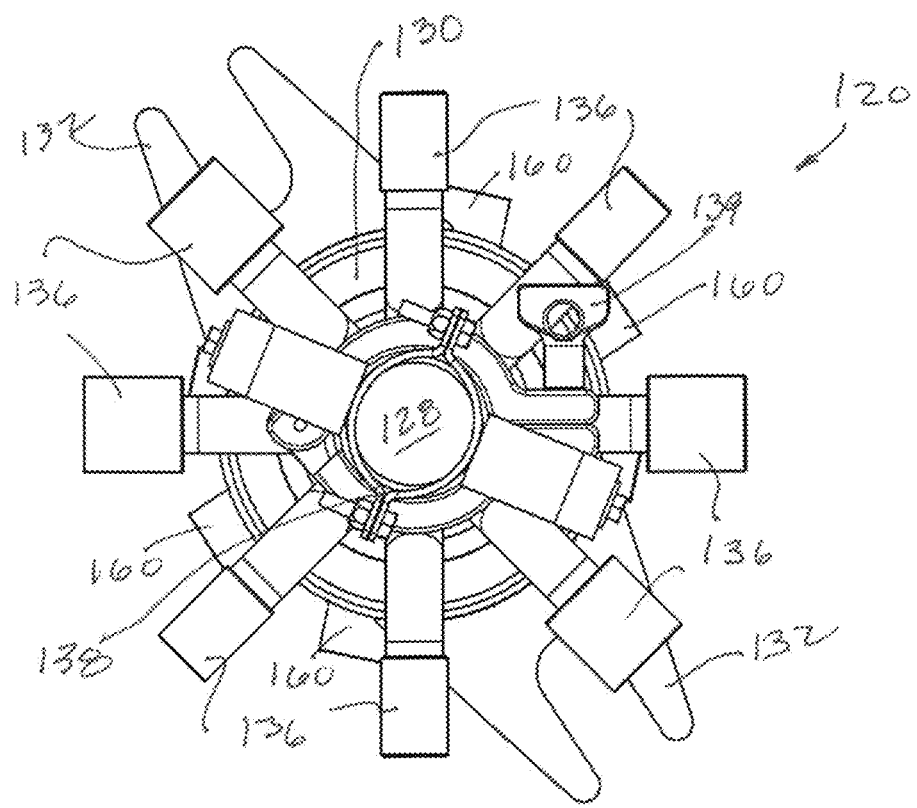
FIG. 10 is a top view of the modular rotary milking parlor media swivel of FIG. 9.
Figure 11:
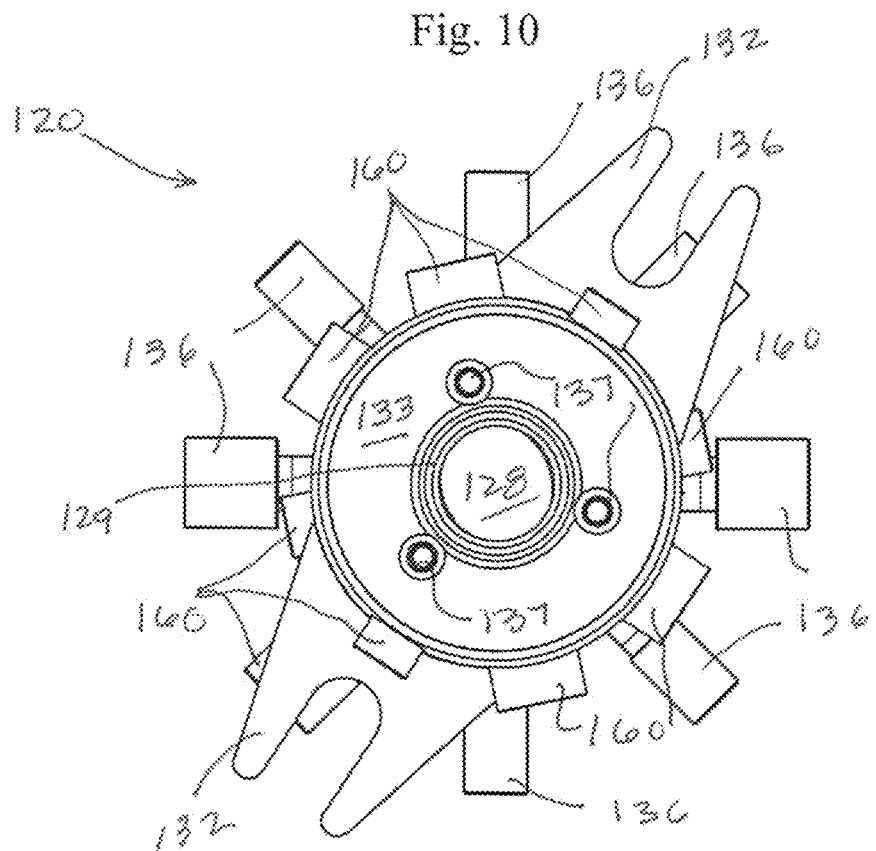
FIG. 11 is a bottom view of the modular rotary milking parlor media swivel of FIG. 10.

As depicted, most of the rotating lines are provided in pairs to serve opposite sides of the rotating platform 32, but one, or more than two, rotating line(s) could also be used, depending on desired flow capacities, sizes of the lines, desired flow volumes, and piping arrangements. All of the lines connect to their respective swivels at appropriate couplings that are best seen in FIG. 6. As used herein, "lines" can include any suitable conduit, tube, pipe, hose, coupling, or any other structure that conveys fluids between two locations and the terms can be used interchangeably. The term "line" also describes electrical cables and wires for transmitting electrical current.

In the illustrated rotary milking parlor swivel assembly 66, there is at least one (and preferably two) rotating milk lines 104 mounted on the rotating platform 32 for collecting milk through a manifold or some other configuration of pipes (not illustrated) from all of the milker units 36 on the rotating platform 32 through the milker unit deck conduit 55 (see FIG. 2). The rotating milk lines 104 communicate with the good milk swivel 86, as described above. The good milk swivel 86 is then connected to a pass through conduit 128 in the modular media swivel 120 (described in more detail below), and then to the stationary good milk line 60.

Modular Media Swivel

As indicated above, various types of media such as air, water, teat dips and backflushing fluids can be used in a rotary milking parlor 30, but they flow in the opposite direction as the milk. These media can be provided through one or more of the stationary media inlet lines 110, and the present invention enables the rotary milking parlor swivel assembly 66 to be customized with a modular media swivel 120 for any particular installation.

Different types and quantities of media are used in different installations. For example, air is used to operate milker unit detacher units on most rotary milking parlors 30. In other dairies, water is used for washing animals and equipment, teat dips are applied to animals before and/or after milking, and backflushing fluids may be used for rinsing and cleaning equipment. Any or all of these media can be provided depending on the particular installation. Further, the above-described media types are used in different volumes, flow rates, and pressures from one another, and may differ from installation to installation.

Using a standard or uniform sized and configured rotary milking parlor swivel can be wasteful and inefficient because some media conduits go unused or are a uniform conduit size that may not match flow, rate pressure, and volume requirements for a particular dairy. Even when some of the conduits go unused, they have seals that must be maintained, so maintenance costs are unnecessarily high in standardized media swivels. Further, in large installations, multiple media conduits may be necessary for a single type of media, which could limit the number of available conduits for other types of media.

The present invention provides versatility in the numbers and sizes of conduits for any desired media type, quantity, volume, flow rate, and pressure that would be suitable for a particular installation. As seen in FIGS. 8 through 12 and described in detail below, the modular media swivel 120 of the present invention includes media modules 122 and each media module 122 can be dedicated to a particular media. Further, the media modules 122 are easily stacked and configured to accommodate any number or type of media.

Each media module 122 in the media swivel 120 includes a stationary core segment 124 and rotating sleeve segment 126 for transporting media from stationary media inlet lines 110 to rotating media outlet lines 112 on the rotating platform 32, as well as an interface 127 (FIGS. 9, 12, and 13) disposed to engage an adjacent media module 122. All of the media modules 122 have necessary conduits, structural components, and interfaces 127 disposed to interact and communicate with adjacent media modules 122 as they are stacked to form the modular media swivel 120.

As best seen in FIGS. 8 to 12, the multiport modular swivel assembly 120 also preferably defines a central stationary pass through conduit 128 for good milk flowing from the good milk swivel 86 to the stationary good milk line 60. The stationary pass through conduit 128 is preferably defined by segments 131 that can be stacked to accommodate any number of media modules 122. The segmented pass through conduit 128 is a preferred construction, but a uniform length pass through conduit 128 could be used so long as it is dimensioned to accommodate all of the media modules 122.

Further, in the present embodiment, the pass through conduit 128 is used for good milk, but the pass through conduit 128 could be used for other dairy fluids or multiple dairy fluids, of the type discussed above. Also, more than one pass through conduit 128 could be used.

The central stationary pass through conduit 128 and the media modules 122 are preferably mounted on the good milk swivel 86 using any suitable means such as a coupling 129 that is connected with a clamp, bolts or other suitable connectors, and at the top to a top swivel clamp 138 that connects to the stationary frame 68. Preferably, the clamp 138 includes a hand screw 139 to tighten the clamp 138. The rotating sleeve segments 126 are attached to the rotating platform 32 with brackets 132, tabs, hangers, or any other suitable connectors. The media modules 122 can include the pass through conduit or the pass through conduit can be a separate item disposed in a central opening of the modular media swivel 120, if desired. A top good milk support bracket 135 can be used to stabilize the stationary good milk line 60.

A media module 122 stationary core segment 124 may or may not include a segment of the pass through conduit 128. In some installations, a standard sized pass through conduit 128 will be used regardless of the number and size of media modules 122 that are used. Each stationary core segment 124 is preferably annular and is disposed around the pass through conduit 128, but if no pass through conduits are used, the stationary core segments 124 could be any desirable shape.

Figure 12:
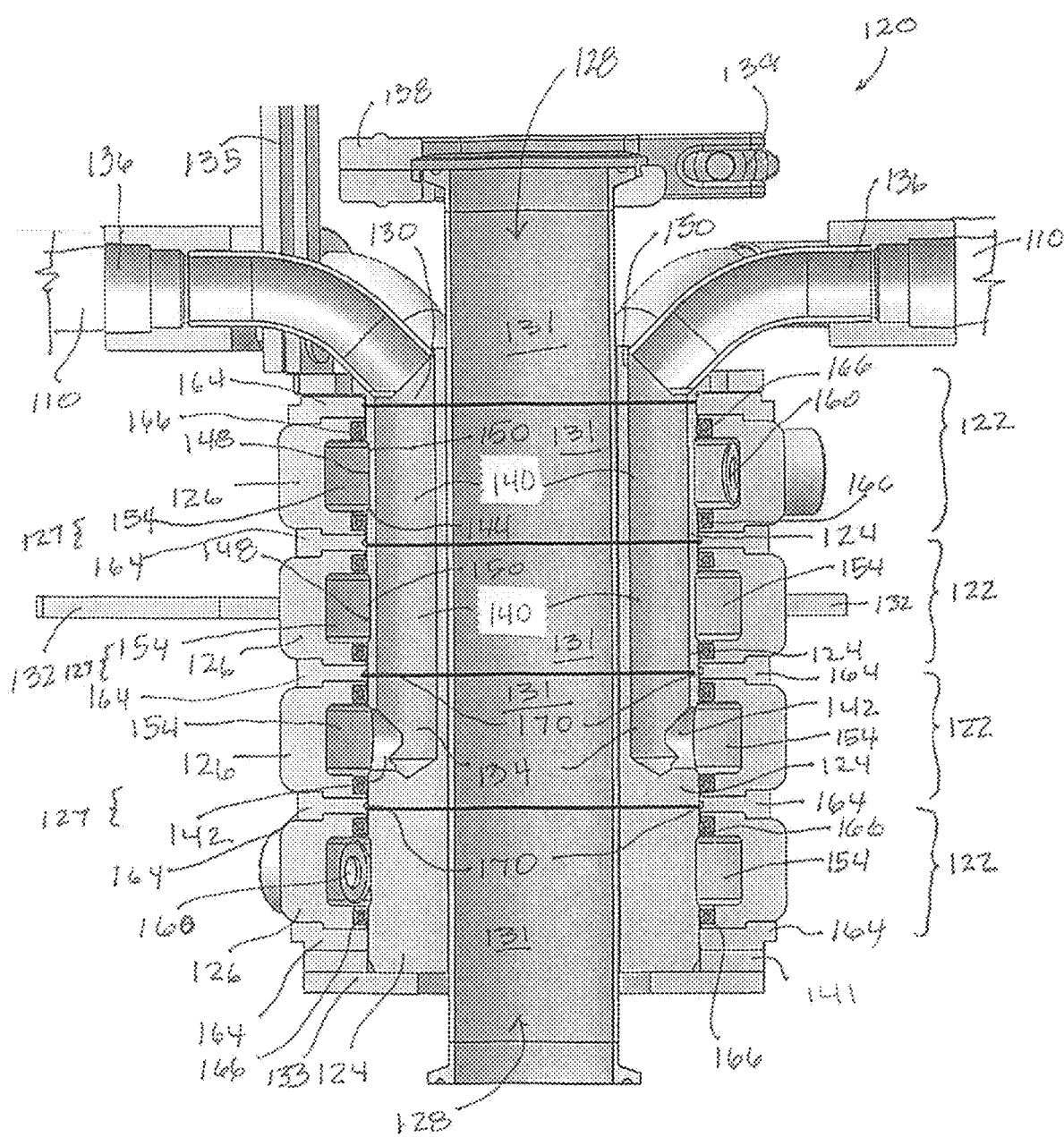
FIG. 12 is a cross sectional side elevation view of the modular rotary milking parlor media swivel taken along line 12-12 of FIG. 10.

As best seen in FIG. 12, the media swivel 120 includes a top media inlet cap 130 to serve as a junction for stationary media inlet lines 110. In the illustrated embodiment, there are two media inlets 136 for each media being provided through the bifurcating junction 114 for the stationary media inlet lines 110. The top media inlet cap 130 also provides a top structure for clamping media modules 122 together with a bottom plate 133 and bolts 137 (FIGS. 9 and 11), for example, that are sized to match the weight of the media swivel 120. A bottom retaining ring plate 141, or any other suitable containment elements, can be used as well to hold the media modules 122 together.

Each stationary core segment 124 includes a stationary dedicated vertical conduit 134 that can communicate either directly or indirectly with a media inlet 136. The dedicated vertical conduit 134 can be "dedicated" because it can provide media that is dedicated to that media module 122 and is preferably sized and shaped to accommodate a particular media. In addition to a dedicated stationary vertical conduit 134, a stationary core segment 124 may include one or more stationary media pass through conduits 140 that act as a passthrough for media flowing to another media module 122. If the media module 122 is not on top of the rotary milking parlor swivel assembly 66, a matching stationary media pass through conduit 140 of an adjacent media module 122 is used to connect the two together. Aligning a stationary media pass through conduit 140 in one media module 122 with a stationary media pass through conduit 140 in an adjacent module 122 provides a complete flow path from a media inlet 136 to a particular media module 122, no matter where in the stack of media modules 122 it is arranged. Each stationary core segment 124 also includes a media outlet 142, preferably directed radially outwardly, as illustrated.

Each media module 122 also includes a rotating sleeve segment 126 having a media conduit opening 148 that is disposed to communicate with the media outlet 142 in the stationary core segment 124. The media conduit opening 148 is defined by the conduit end 150, an opens inwardly to an annular media conduit 154 that communicates with a media outlet 160 for that rotating sleeve segment 126. Each media module 122 preferably is made of stainless steel or some other durable and hygienic material.

Further, as seen in the cross-sectional view of FIG. 12, the rotating sleeve segments each include conduit ends 150 that engage and rotate in corresponding grooves 144 in the stationary core to support the weight of the rotating sleeve segment 126 while still allowing for smooth rotational movement around the stationary milk line 60. Other mounting methods for both the pass through conduit 128 and the rotating sleeve segments 126 are possible within the scope of the present invention.

As stated above, the media inlet 136, the conduits 134 and 150, and media outlet 160 are all preferably manufactured to a size to match the quantity, flow rate, and pressure for the media flowing through that media module 122. Further, the stationary media pass through conduit 140 is preferably sized to match the media for the media module 122 to which that media is flowing.

The bracket 132 used to join the rotating sleeve segment 126 assembly (when more than one segment 126 is used) to the rotating platform 32 is preferably joined to a single rotating sleeve segment 126. A substantial amount of torsion is transferred from the rotating platform 32 to the rotating sleeve segment 126 and without a bracket for each rotating sleeve segment 126, the torsion must be transferred from the rotating sleeve segment 126 with the bracket 132 to the other rotating sleeve segments 126 above and below.

Therefore, in accordance with the present invention, each rotary swivel media module 122 includes at least one module interface 127 that engages an adjacent media module 122 above or below. The interface 127 preferably includes stationary conduit interfaces disposed to engage corresponding conduit interfaces on an adjacent rotary media module 122. Further, the interfaces 127 preferably have mating rotating sleeve segments 126, including mating engagement surfaces that engage one another so that they rotate in unison, for example. Preferably, a portion of the interface 127 between media modules 122 is a bearing 164 that serves to distribute loads between each media module 122 and also to transfer at least a portion of the rotational torsion of rotating sleeve segments 126, as mentioned above. The bearing 164 can include interlocking, surfaces, connectors, or relatively high friction material that engage mating surfaces in or on the adjacent media module 122 rotating sleeve segment 126 to provide for the torsion transmission.

The bearings 164 preferably are made of plastic, reinforced plastic, or another suitable material, to minimize wear when the bearings 164 are rotating about the stationary core segments 124. Further, the bearings 164 are shaped to maintain the rotating sleeve segments 126 away from the stationary core segments 124 to prevent metal on metal contact as the rotating sleeve segments 126 rotate around the stationary core segments 124, as seen by the annular clearance gap 184 in FIG. 13.

Figure 13:
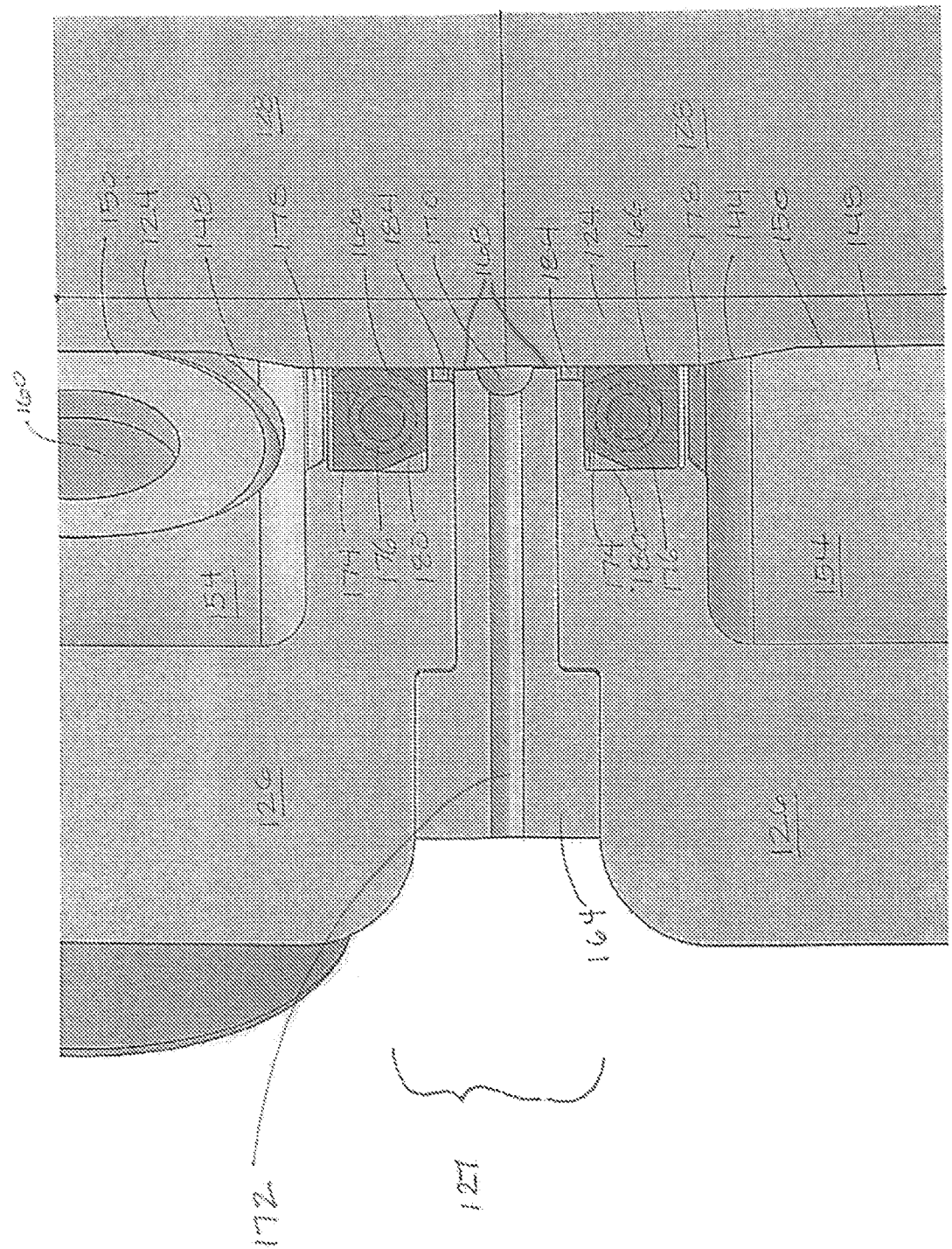
FIG. 13 is a partial cross-sectional elevational view of a bearing interface between a rotating swivel and a stationary core in accordance with the present invention.

In addition, the bearings 164 serve another function as illustrated in FIGS. 12 and 13. To prevent or minimize leakage from the interface between each stationary core segment 124 and its corresponding rotating sleeve segment 126, seals 166 are provided above and below the conduits ends 150 in a recess defined by the rotating sleeve segment 126. The seals 166 are subject to constant wear from the relative rotational movement of the rotating sleeve segment 126 and the stationary core segment 124. Further, degradation from exposure to teat dips and sanitary fluids can cause the seals 166 to leak. Finally, differential pressure between adjacent media module 122 conduits can cause leakage between media modules 122, which could be catastrophic if the milk were contaminated.

To prevent leakage and seal failure between the media modules 122, a block-bleed-block arrangement is provided. The block-bleed-block function of the invention prevents migration of media through the seals 166 into adjacent media modules 122 and the milk pass through conduit 128 by supplying a pair of spaced apart seals 166 and a vent 172 or "bleed" to atmosphere, with an annular vent 170 being disposed between two seals. Multiple block-bleed-block arrangements can be used in the invention to provide redundancy and added safety.

More specifically, the block-bleed-block function of the present invention is accomplished with each of the bearings 164 defining on its inner annular surface 168, the annular vent 170 that is open to the adjacent stationary core segments 124 and to an external radially oriented vent 172 that is open to the atmosphere. The radially oriented vent 172 is preferred as illustrated, but other configurations of atmospheric vents can be used in the present invention. The annular vent 170 is disposed between pairs of seals 166 in adjacent rotating sleeve segments 126, which thereby provides a "bleed" between two "blocks." This arrangement eliminates any possibility of cross-contamination between adjacent media modules 122. The seals 166 are preferably spring energized seals, as described below.

In addition to the stacking stationary core segments 124 and rotating sleeve segments 126 described above, the seals 166 (illustrated in FIG. 13) used in the present invention are preferably spring energized seals using a polyethylene annular cup with a Hastelloy coiled spring 176 disposed in the cup 174. The polyethylene cup 174 engages the mating surfaces to be sealed, and the spring 176 maintains interface engagement even if the cup surface wears. The polyethylene is resistant to degradation from teat dips and backflushing fluids, and does not require lubrication like elastomer seals. A retainer 178 is used to maintain the seals 166 in their respective seal grooves 180, and an annular clearance gap 184 can also be provided.

Figure 14:
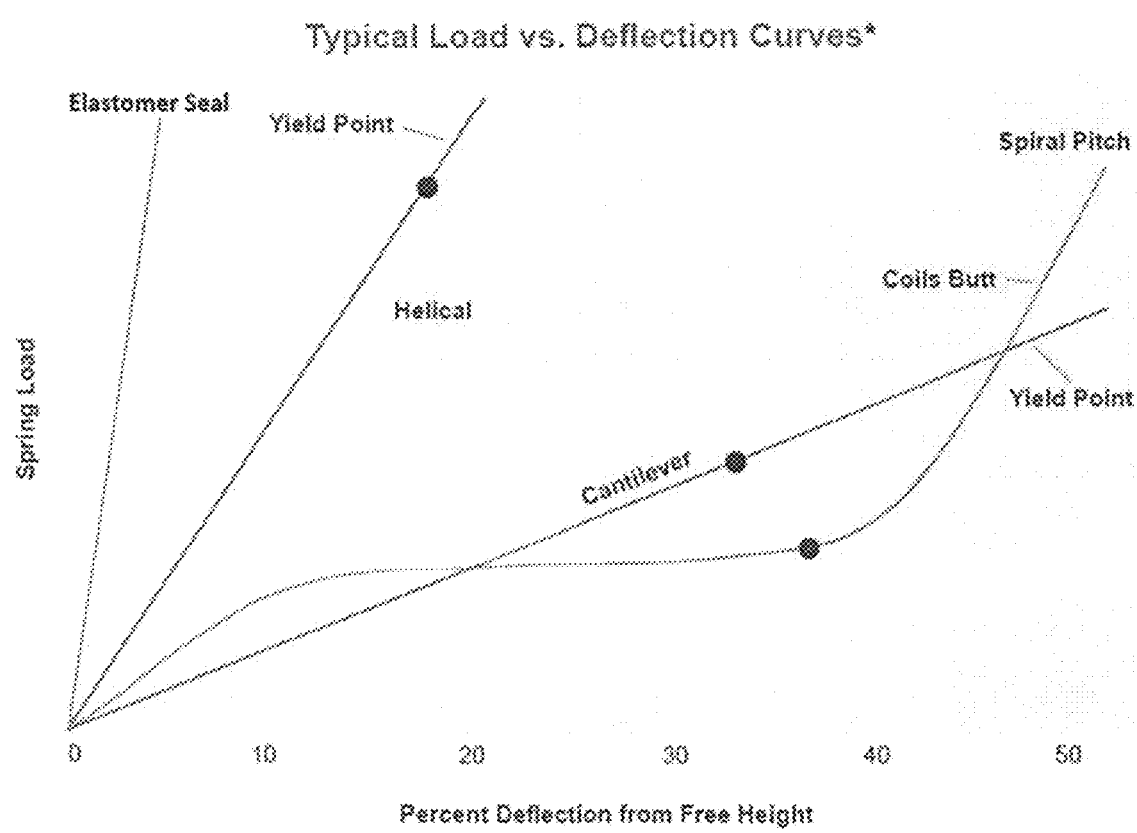
FIG. 14 is a chart comparing various seals for use in the present invention.

A chart in FIG. 14 showing a comparison between different types of seals and the preferred spring energized seal. The chart illustrates changes in deflection from free height as spring load increases. The horizontal portion of the coil spring and polyethylene cup seal curve indicates that the deflection from free height can change from about 10% to about 38% at a near constant spring load. This suggests that spring seals will work very well as they wear and as they move against deformities in mating surfaces.

The above detailed description of the present invention is intended for clearness of understanding the invention, and no unnecessary limitations therefrom should be read into the following claims.

The invention claimed is:

1. A modular rotary milking parlor swivel comprising:
   a first media module having:
      a stationary central core segment defining a media inlet port and a stationary media conduit;
      a rotating sleeve segment disposed at least partially around the stationary central core segment, the rotating sleeve segment defining a media outlet port in communication with the stationary media conduit; and
      a media module interface disposed to engage a second media module, the media module interface having a bearing, disposed between the first media module and the second media module, the bearing constructed and arranged to (i) maintain a spacing between the rotating sleeve segment of the first media module and a rotating sleeve segment of the second media module and (ii) engage the rotating sleeve segment of the first media module and the rotating sleeve segment of the second media module to rotate in unison,
      wherein the modular rotary milking parlor swivel further comprises (i) a seal disposed below the bearing between the rotating sleeve segment of the first media module and the stationary core segment of the first media module and (ii) an annular gap disposed between the bearing and the first seal, the annular gap providing a space between the rotating sleeve segment of the first media module and the stationary core segment of the first media module.

2. The modular rotary milking parlor swivel of claim 1, wherein the media module interface includes:
   a first stationary core segment interface adapted to align with a second stationary core segment of the second media module.

3. The modular rotary milking parlor swivel of claim 1, wherein the stationary central core segment further defines a first segment of a stationary central pass through conduit, and
   wherein the second media module includes:
      a second stationary central core segment defining a second segment of the stationary central pass through conduit; and
      a second media module interface disposed to align with the first media module interface of the first media module.

4. The modular rotary milking parlor swivel of claim 1, wherein:
   the second media module includes:
      a second stationary central core segment defining a second media inlet port and a media pass through conduit in communication with the media inlet port of the stationary central core segment of the first media module;
      the rotating sleeve segment of the second media module disposed for rotary movement at least partially around the second stationary central core segment; and
      a second interface disposed to align with the media module interface of the first media module.

5. The modular rotary milking parlor swivel of claim 1, and further comprising:
   a spring energized seal disposed between the rotating sleeve segment of the first media module and the stationary central core segment of the first media module.

6. The modular rotary milking parlor swivel of claim 1, wherein the rotary sleeve segment of the first media module further comprises:
   a second media outlet port in communication with a corresponding redundant media inlet defined by the stationary central core segment.

7. The modular rotary milking parlor swivel of claim 1, wherein the
   stationary central core segment is adapted to releasably engage a second stationary central core segment of the second media module.

8. The modular rotary milking parlor swivel of claim 1, wherein the media inlet port is an air inlet port and the media outlet port is an air outlet port.

9. The modular rotary milking parlor swivel of claim 1, wherein:
   the media inlet port is a water inlet port, and the media outlet port is a water outlet port.

10. The modular rotary milking parlor swivel of claim 1, wherein:
    the media inlet port is a backflushing fluid inlet port, and the media outlet port is a backflushing fluid outlet port.

11. The modular rotary milking parlor swivel of claim 1, wherein:
    the media inlet port is a teat dip fluid inlet port, and the media outlet port is a teat dip fluid outlet port.

12. The modular rotary milking parlor swivel of claim 1, wherein the bearing has (i) a lower surface that conforms to an upper surface of the rotating sleeve segment of the first media module and (ii) an upper surface that conforms to a lower surface of the rotating sleeve segment of the second media module.

13. The modular rotary milking parlor swivel of claim 1, further comprising:
   a second seal disposed above the bearing between the rotating sleeve segment of the second media module and the stationary core segment of the second media module.

14. The modular rotary milking parlor swivel of claim 13, further comprising:
   a second annular gap between the bearing and the second seal, the second annular gap providing a space between the rotating sleeve segment of the second media module and the stationary core segment of the second media module.

15. The modular rotary milking parlor swivel of claim 13, wherein the bearing includes a vent that extends between an inner annular surface of the bearing and an outer annular surface of the bearing.

16. The modular rotary milking parlor swivel of claim 15, wherein the vent is constructed and arranged to equalize pressure and thereby eliminate cross-contamination between the first media module and the second media module.

* * * * *